US008551371B2

(12) United States Patent
Hawkes et al.

(10) Patent No.: US 8,551,371 B2
(45) Date of Patent: Oct. 8, 2013

(54) METHOD AND COMPOSITION

(75) Inventors: Jamie Anthony Hawkes, Leeds (GB); Paul Webb, Yorkshire (GB); David Malcolm Lewis, Yorkshire (GB); Andrew Bayliff, Cumbria (GB)

(73) Assignee: Perachem Limited, Leeds Yorkshire (GB)

( * ) Notice: Subject to any disclaimer, the term of this patent is extended or adjusted under 35 U.S.C. 154(b) by 572 days.

(21) Appl. No.: 12/676,690

(22) PCT Filed: Sep. 3, 2008

(86) PCT No.: PCT/GB2008/050776
§ 371 (c)(1),
(2), (4) Date: May 25, 2010

(87) PCT Pub. No.: WO2009/030947
PCT Pub. Date: Mar. 12, 2009

(65) Prior Publication Data
US 2010/0224840 A1  Sep. 9, 2010

(30) Foreign Application Priority Data

Sep. 7, 2007  (GB) .................................. 0717401.4
Apr. 8, 2008  (GB) .................................. 0806334.9

(51) Int. Cl.
*C09K 21/04* (2006.01)
*C08K 5/21* (2006.01)
*C08B 15/05* (2006.01)
*B05D 3/02* (2006.01)
*B05D 3/10* (2006.01)

(52) U.S. Cl.
USPC ............. 252/607; 252/606; 252/608; 169/43; 169/44; 169/45; 427/380; 427/384; 427/337; 524/211; 536/101

(58) Field of Classification Search
USPC ................ 252/606, 607, 608; 169/43, 44, 45; 427/380, 384, 337; 524/211; 536/101
See application file for complete search history.

(56) References Cited

U.S. PATENT DOCUMENTS

| 2,913,356 | A | * | 11/1959 | Schroeder | 162/157.6 |
|---|---|---|---|---|---|
| 3,165,423 | A | * | 1/1965 | Caldwell et al. | 442/76 |
| 3,507,610 | A | * | 4/1970 | Tesoro et al. | 8/120 |
| 3,560,479 | A | * | 2/1971 | Pande | 536/30 |
| 3,827,907 | A | * | 8/1974 | LeBlanc | 427/341 |
| 3,899,483 | A | * | 8/1975 | Le Blanc | 536/84 |
| 4,013,813 | A | * | 3/1977 | LeBlanc et al. | 442/142 |
| 5,595,828 | A | * | 1/1997 | Weber et al. | 428/537.5 |
| 2003/0092598 | A1 | * | 5/2003 | Gardner et al. | 510/513 |
| 2005/0019363 | A1 | * | 1/2005 | Blount | 424/405 |
| 2005/0130841 | A1 | * | 6/2005 | Blount | 504/101 |
| 2006/0085920 | A1 | * | 4/2006 | Scheper et al. | 8/115.51 |
| 2006/0166652 | A1 | * | 7/2006 | Hwang | 455/412.1 |
| 2010/0224840 | A1 | * | 9/2010 | Hawkes et al. | 252/609 |

FOREIGN PATENT DOCUMENTS

| GB | 782418 | 9/1957 |
|---|---|---|
| WO | 03042329 A1 | 5/2003 |
| WO | 2007095010 A1 | 8/2007 |

OTHER PUBLICATIONS

Patent Cooperation Treaty (PCT), PCT/GB2008/050776, International Preliminary Report on Patentability and Written Opinion of the International Searching Authority dated Mar. 18, 2010, 7 pages.
Patent Cooperation Treaty (PCT), PCT/GB2008/050776, International Search Report, Nov. 26, 2008, 4 pages.
Inagaki et al., "Phosphorylation of Cellulose with Phosphorous Acid and Thermal Degradation of the Product", Oct. 1976, Journal of Applied Polymer Science, vol. 20, No. 10, pp. 2829-2836 (XP-002505464).
Inagaki et al., "Modification of Cellulose Phosphonate with N,N-Dimethylacrylamide and 4-Vinylpyridine, and Flame-Retardant Properties of the Products", Nov. 1978, Journal of Polymer Science, Polymer Chemistry Edition, vol. 16, No. 11, pp. 2771-2779 (XP-002505465).

* cited by examiner

*Primary Examiner* — Joseph D Anthony
(74) *Attorney, Agent, or Firm* — Hoffman Warnick LLC

(57) ABSTRACT

A method of treating a material to improve flame retardancy, the method comprising applying to the material urea, phosphorous acid or a salt thereof, and a base comprising a monovalent metallic cation.

11 Claims, 3 Drawing Sheets

| Drying | Bake 1 | Bake 2 | Wash Fastness Tests ||
| --- | --- | --- | --- | --- |
| | | | 0WFT | 5WFT |
| 120°C 60s | 200°C 90s | NONE | Pass | Fail |
| 120°C 60s | 200°C 90s | 200°C 90s | Pass | Pass |

| White Paper | 140°C Bake | 150°C Bake |

METHOD AND COMPOSITION

The present invention relates to flame retardant compositions and methods relating thereto.

Many materials, for example cotton, cotton rich blends and other cellulosic materials such as paper, require chemical treatment in order to render them flame retardant. This is particularly important when the materials are to be used in certain applications, for example curtains, workwear, furnishing fabrics, military applications and children's nightwear. Another important area is wool and wool based furnishing fabrics particularly for the transport-seating sector.

It is desirable that the flame retardant materials are low cost, durable, do not materially detract from the mechanical properties of the fabric, are able to tolerate traditional dyeing and printing processes for all colour ranges, meet health and safety requirements, and are environmentally acceptable.

Flame retardant (FR) compositions of the prior art are based on systems which include salts of phosphoric acid and ammonia or ammonium phosphates. However a disadvantage with such FR compositions of the prior art is that they do not have good wash durability and can be washed out of fabric during rinsing or normal laundering.

These and other features of embodiments of the invention will be more readily understood from the following detailed description of the various aspects of the invention taken in conjunction with the accompanying drawings that depict various embodiments of the invention, in which.

It is noted that the drawings are not to scale and are intended to depict only typical aspects of the invention. The drawings should not, therefore, be considered as limiting the scope of the invention. In the drawings, like numbering represents like elements among the drawings.

Figure 1:
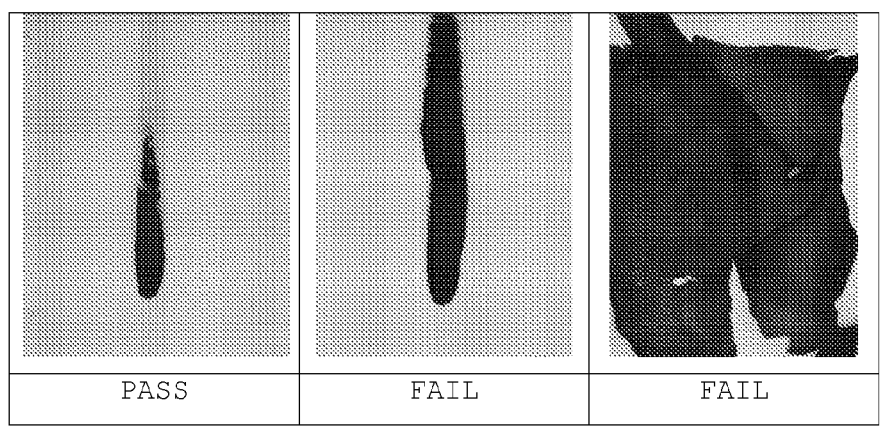
FIG. 1 shows examples of flame test passes and failures for treated cotton fabrics.

The present invention relates in particular to wash-durable flame retardant compositions and related methods.

Flame retardant compositions having wash-durability are known in the prior art, but each of these compositions has disadvantages.

For example, the Proban® system of Rhodia provides a wash-durable finish but leads to a harsh fabric handle and discolouration of simple azo dyes.

Another existing wash-durable FR composition is the Pyrovatex® system of Huntsman but this is relatively expensive and leads to emissions of formaldehyde during coating and residual levels of free formaldehyde on the fabric. Formaldehyde is a known carcinogen.

U.S. Pat. No. 2,482,755 describes flame retardant compositions which in preferred embodiments are acidic in nature and contain phosphoric acid and urea. The compositions are heated for periods of between 3 minutes to 15 minutes. U.S. Pat. No. 2,482,755 teaches that fabrics treated with such compositions are rendered flame proof by incorporation into the fabric of phosphorous and nitrogen moieties.

According to a first aspect of the present invention, there is provided a method of treating a material to improve flame retardancy, the method comprising applying to the material urea, phosphorous acid or a salt thereof, and a base comprising a monovalent metallic cation.

The urea and the phosphorous acid (or salt thereof) and the base may be applied sequentially, in three treatments or in two treatments in any order, or they may be applied simultaneously.

In preferred embodiments they are applied simultaneously. The method of the first aspect suitably comprises applying to a material a composition comprising phosphorous acid or a salt thereof, and urea, and a base comprising a monovalent metallic cation. In some embodiments, the composition applied to the material has a pH of at least 6, for example at least 7, at least 7.5, or at least 8. Suitably the composition applied to the material has a pH of up to 11, or up to 10. In some embodiments, the pH of the composition is about 8.6 to about 9.8.

In some preferred embodiments the pH of the composition may have a pH of from 4.5 to 5.5, for example about pH 5. The use of a composition having a pH of about 5 may improve the handle of the treated material. A lower pH is unfavourable due to tendering/weakening of the treated material during curing at high temperatures.

By phosphorous acid, we mean to refer to the material having a molecular formula $H_3PO_3$ which upon reaction with a base produces phosphite salts.

Salts of phosphorous acid which may suitably be applied to the material are those of monovalent metals, especially alkali metals.

In a method of the first aspect of the present invention comprising applying a base comprising a monovalent metallic cation, that base may include alkali metal hydroxides, alkali metal bicarbonates, alkali metal carbonates and other such materials known to those skilled in the art. The alkali metal cation of the base may include sodium, potassium and lithium. Most preferably the alkali metal cation is potassium.

According to a second aspect of the invention, there is provided a flame retardant composition comprising phosphorous acid or a salt thereof, urea and a base comprising a monovalent metallic cation.

Suitable bases include alkali metal hydroxides, alkali metal bicarbonates, alkali metal carbonates and other such materials known to those skilled in the art.

Any alkali metal hydroxide can be used but preferred are sodium hydroxide and, especially, potassium hydroxide.

The method of the first aspect of the present invention preferably comprises applying to a material a composition of the second aspect.

The composition may further comprise ammonia and water soluble or dispersable organic amines, such as triethanolamine, which may be used to adjust the pH thereof. When the treated fabric is heated volatile bases could evaporate moving the pH lower. In such cases, the presence of monovalent metallic bases will act to buffer the pH of the material (for example a fabric) and could prevent the pH falling to the extent that the fabric is damaged.

Free phosphorous acid may be added to the composition or a phosphorous acid salt may be provided. The skilled person will appreciate that in embodiments in which free phosphorous acid is used, this may under certain conditions be present in the composition as a salt.

In a preferred embodiment the composition comprises at least 60 $gdm^{-3}$ phosphorous acid, preferably at least 80 $gdm^{-3}$, more preferably at least 90 $gdm^{-3}$, more preferably at least 120 $gdm^{-3}$, and most preferably at least 150 $gdm^{-3}$. The composition may suitably comprise up to 300 $gdm^{-3}$ phosphorous acid, for example up to 275 $gdm^{-3}$, and preferably up to 250 $gdm^{-3}$.

The composition may suitably comprise at least 100 gdm$^{-3}$ urea, preferably at least 150 gdm$^{-3}$, preferably at least 200 gdm$^{-3}$, more preferably at least 250 gdm$^{-3}$, and most preferably at least 300 gdm$^{-3}$.

The composition may suitably comprise up to 500 gdm$^{-3}$ urea, for example up to 450 gdm$^{-3}$, preferably up to 400 gdm$^{-3}$, and more preferably up to 375 gdm$^{-3}$.

The composition may suitably comprise said base at a concentration of at least 1M (Molar), preferably at least 1.4M, preferably at least 1.8M, more preferably at least 2M and most preferably at least 2.8M, The composition may suitably comprise said base at a concentration of up to 5M, more preferably up to 4.5M, preferably up to 4M, and most preferably up to 3.6M.

The concentrations stated above are generally suitable but especially applicable for a composition intended to be applied at 100% wpu (wet pick-up).

The weight ratio of urea to phosphorous acid in the composition of the present invention is preferably at least 1:1, more preferably at least 1.2:1, and most preferably at least 1.3:1.

The weight ratio of urea to phosphorous acid is preferably up to 6:1, for example up to 5:1, preferably up to 4:1, and most preferably up to 3:1.

When there is present a salt of phosphorous acid the definitions herein of quantity of phosphorous acid or weight ratio of phosphorous acid to another component apply to the acid residue of the salt.

In some embodiments the composition may further comprise a water soluble or water dispersable cationic polymeric resin. Preferred are cationic cross-linking resins, most preferred are cationic resins which are capable of self cross-linking or cross-linking under a baking or curing regime. Specific selection of the optimum resin can be made according to specific circumstances relating to the end-use by someone skilled in the art. Examples of such components include polyaminoamide-epichlorohydrin resins such as Hercosett 125 (Hercules) or Beetle Resin PT765 (BIP), polyquaternary ammonium compounds such as Tinofix FRD (Ciba) or Levogen FL (Bayer) or cyclanon E (BASF), or polyamine aliphatic quaternary amines such as Optifix F (Clariant). We have found certain polyaminoamide-epichlorohydrin resins to be particularly effective for the flame retardant treatment of cotton textiles.

The water soluble or water dispersable cationic resin may be included in the composition at the time of manufacture, or it may be added to the composition prior to use. The point of addition will be determined by the particular system in use and the storage stability of the chosen resin when mixed with the other components of the flame retardant composition. Such considerations are commonplace and well known to those skilled in the art.

In a preferred embodiment the composition comprises at least 5 gdm$^{-3}$ of a water-soluble cationic polymeric resin, preferably at least 15 gdm$^{-3}$, more preferably at least 30 gdm$^{-3}$, and most preferably at least 45 gdm$^{-3}$.

The composition may suitably comprise up to 250 gdm$^{-3}$ water-soluble cationic polymeric resin, preferably up to 150 gdm$^{-3}$, more preferably up to 75 gdm$^{-3}$, and most preferably up to 55 gdm$^{-3}$.

The use of a cationic polymeric resin is highly advantageous in the present invention. A material, for example a cellulosic material, which has been treated with phosphorous acid may have a high concentration of covalently bonded and also unbound phosphite residues on the surface. This leads to an anionic surface which is hydrophilic and thus likely to absorb water. The material therefore often becomes damp and may also be prone to shrinkage. The inclusion of a cationic polymeric resin helps to reduce the anionic nature of a phosphorous acid treated material and thus helps to prevent dampness and shrinkage. Careful choice of an appropriate cationic polymeric resin by those skilled in the art, can improve the physical handle of the fabric and may also impart hydrophobic properties. This method could thus be used to provide waterproof fabrics.

In a further embodiment of the present invention, the composition may include a dispersed phase material, for example a pigment, filler or mixtures thereof. Examples of such materials include flame retardant pigments such as magnesium hydroxide, calcium carbonate, aluminium phosphate, aluminium phosphite, aluminium silicate, magnesium phosphite and magnesium phosphate. Other pigments may be used to impart other properties such as colour, opacity, hydrophobicity, easy iron properties and a soft handle. The range of suitable dispersed phase materials is large. Appropriate selections could however be readily made by the person skilled in the art, according to the precise properties required. Some suitable materials for use in the present invention are included in the examples.

In a preferred embodiment the composition comprises at least 0.1 gdm$^{-3}$ flame retardant pigment, preferably at least 5 gdm$^{-3}$, more preferably at least 10 gdm$^{-3}$, and most preferably at least 15 gdm$^{-3}$.

The composition may suitably comprise up to 220 gdm$^{-3}$ flame retardant pigment, preferably up to 150 gdm$^{-3}$, more preferably up to 100 gdm$^{-3}$, and most preferably up to 50 gdm$^{-3}$.

If the pigment or combination of pigments are added for the purpose of colouring, then the amount used would be determined by the desired shade. However, it would not normally exceed 50gdm$^{-3}$ The present inventors have surprisingly found that it is particularly advantageous to include a cationic polymeric resin in combination with a pigment, in particular where the pigment employs a dispersing agent with anionic groups.

The composition is preferably an aqueous composition. The composition may suitably be prepared by the addition of urea to an aqueous solution of phosphorous acid. Potassium hydroxide or sodium hydroxide may then be added to provide a composition having a desired pH. This may be, for example, approximately pH 7. In other embodiments it may be approximately pH 5. A higher pH, for example pH 7.4 to 10, may be obtained by addition of additional basic material.

The overall concentration of the composition, as the treatment liquor, will be selected to fit with the wet pick up afforded by the selected equipment and for the overall economics and performance balance afforded by the resulting treatment rates. Such considerations are commonplace to those skilled in the art. The composition may be provided in concentrated form, to be diluted by the user. Additionally, for example in order to reduce the overall cost of the treatment the composition may be supplied pre-diluted in which case the concentration ranges stipulated can be reduced pro rata. Where concentrations of reagents are specified in this invention, these are based on a nominal wet pick up of 100%. The compositions of this invention can be applied to the substrate by a number of methods known in the industry. For textile substrates pad-stenter equipment is commonplace. The wet pick up can vary according to the precise machine configuration and adjustment of liquor concentration by the user to accommodate the machine set-up is routine.

Preferably the material is a fibre-based web material, for example a paper or card or, most preferably, a fabric, including a knitted or woven fabric, or a non-woven material. Suitable materials include cotton, viscose, lyocell, keratin-based fibre (e.g. wool) and synthetic fibres; and blends of any of the above. Most preferably the material is a cellulose-containing material, especially containing at least 50% cellulosic content. Preferred materials are cotton and cotton-rich fabrics, containing at least 50% cotton (e.g. 75/25 cotton/polyester fabric); and keratin based materials such as wool.

Although the invention is not limited to fabric treatment, for ease of understanding further discussion of the method the invention will be described in this context.

In the method of the first aspect, the composition may be applied to the material by any means suitable. A preferred method for a fabric is padding, a term well understood by those skilled in the art. Padding may take place, for example at a speed of about 50 meters per minute.

Preferably the method of the first aspect further comprises a step (x) of curing the composition on the material.

The curing step (x) may be achieved by a number of alternative methods. In one method the treated material may be batched at an appropriate temperature. Batching is a process well known to those skilled in the art. Batching comprises rolling up the freshly treated fabric into a cylinder which is protected by an impervious layer of material, for example polythene. The roll is then stored at the appropriate temperature until the active components have penetrated the yarns and fibres of the substrate. The temperature may be below or above or at ambient temperature.

In another embodiment, the treated material is cured by being baked in an oven, suitably by feeding the fabric web through a heating station (e.g. tentering or stentering).

It is possible with some advanced equipment designs to closely control the heated zones the fabric passes through with respect to temperature profile, humidity and other environmental features. Such methods may produce benefits in the performance of the final product and also reduce application costs.

Baking is preferably carried out at a temperature of at least 120° C., preferably 150° C., more preferably at least 170° C. The baking temperature is preferably less than 220° C., more preferably less than 200° C., most preferably less than 190° C.

The material is preferably baked in an oven for a period of at least 20 seconds, more preferably at least 30 seconds, and most preferably at least 40 seconds.

The material may be baked in the oven for up to 15 minutes. Preferably it is baked for a period of up to 3 minutes, for example up to 2 minutes, preferably up to 90 seconds, and more preferably up to 60 seconds.

Preferably the method may comprise a further step (y) following the curing step (x), of rehydrating the material. Rehydration may be achieved by a number of alternative methods. In some embodiments exposing the material to air for a period of at least 3 minutes, for example 5 minutes, is sufficient to enable rehydration to occur.

In another embodiment the rehydration step may involve treating the material with water. This may be achieved for example, by treatment with steam, by spraying, by misting or by padding.

In some embodiments the rehydration step may comprise a step of treating the material for a second time with a composition in accordance with the second aspect. The formulation of the composition may be the same or different to that used in the first treatment step. Alternatively it may comprise treating the material with an aqueous composition containing urea but preferably not phosphorous acid.

The method of the present invention suitably comprises a further curing step (z), following the curing step (x) and, where deployed, a rehydration step (y). The second curing step is suitably carried out within the scope of the definitions given above for the first curing step (x). Those definitions thus apply also to the second curing step (z). Preferably the second curing step is carried out in the same manner as the first curing step (x); steps (x) and (z) are thus preferably substantially identical.

Following the second curing step the method suitably comprises a final step of rinsing and drying the material, by standard methods. For example, rinsing may be carried out by dipping into a series of water baths followed by drying at an elevated temperature, e.g. 50-140° C., suitably approximately 120° C. The final dry weight gain on the fabric can then be approximately 5-15%, preferably approximately 10% solids, on weight of fibre.

The method of the present invention may comprise one or more further treatment steps following the first and/or second curing steps.

For example the material may be rinsed with cold water. It may then be optionally treated with an acidic composition suitably a composition comprising an organic acid, for example formic acid.

The material may be optionally treated with a composition comprising a quaternary ammonium salt. Examples of suitable quaternary ammonium salts include chlorine, tetraalkyl ammonium halides, tertiary amine derivatives of epichlorohydrin or epibromohydrin, and polyamine derivatives.

Suitable tetraalkyl ammonium halides include bromide or chloride salts of quaternary ammonium groups $R_4N^+$ in which each R is independently selected from an alkyl group having from 1 to 24, preferably 1 to 16 carbon atoms.

Specific examples include tetramethyl ammonium bromide and cetyl trimethyl ammonium bromide.

Suitable epichlorohydrin and epibromohydrin derivatives include compounds of formula I:

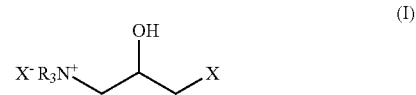

wherein the or each X is independently selected from chlorine and bromine and each R is independently selected from an optionally substituted alkyl group. Each R may be an alkyl group having 1 to 30 carbon atoms. In some embodiments one or more of the R groups is a long chain alkyl group having for example from 10 to 28 carbon atoms.

In some embodiments each R is an alkyl group having 1 to 4 carbon atoms. In an alternative embodiment the R groups may be joined, for example to form a morpholine moiety. In one example $R_3N^+$ represents an N-methyl morpholine residue.

In one preferred embodiment the quaternary ammonium salt is 3-chloro-2-hydroxy-1-trimethylamino propane chloride.

Suitable polyamine derivatives include those known under the trade name ISOL Fixer NFO, which is available from Ionic Solutions, Bradford, UK.

Alternatively and/or additionally the material may be further treated with a composition comprising a metal salt. Suitably the composition is an aqueous composition comprising the salt of a divalent or trivalent metal, preferably selected from magnesium, calcium and aluminium. Preferably the salt is a water soluble salt, for example a chloride, carbonate or sulphate. Suitable salts include magnesium chloride, magnesium sulphate, calcium chloride, calcium carbonate and aluminium sulphate.

Preferably the composition comprises from 1 to 50 g/liter of the salt, for example from 5 to 20 g/liter.

In the one or more optional further treatment steps, the composition(s) may be applied by any suitable means. Such application methods are well known to those skilled in the art and the skilled person could readily select an appropriate technique.

During processing a fabric may be stretched in both directions, but especially in the warp direction of the fabric due to the action of the machinery. This stretching results in a gain of extra fabric which may be useful in case of problems arising in production. In some embodiments, the treatment method of the present invention can reverse the action of the stretching. This may then appear to be a shrinking of the fabric. Use of one or more of the further treatment steps described above following curing helps to minimise shrinkage of the fabric, without causing deleterious effects in relation to the flame retardancy or handling properties of the material.

Shrinkage may also be caused by the increase in hydrophilicity of the material introduced by the incorporation of cellulose-phosphonate ester groups. Introducing divalent or trivalent cations may act to dehydrate these residues and prevent relaxation shrinkage due to excessive water swelling.

According to a third aspect of the present invention there is provided a material treated by the method of the first aspect.

The material of the third aspect is suitably provided with wash-durable flame retardant properties. By this we mean that the material is flame retardant after multiple washes. The precise washing and flame testing requirements are a matter for local legislation in the jurisdiction in which the product will eventually be marketed. By way of example wash tests include BS5651:1978 (Cleansing and wetting procedures for use in the assessment of the effect of cleansing and wetting on the flammability of textile fabrics and fabric assemblies); BS EN ISO 12138:1997 (Textiles—Domestic laundering procedures for textile fabrics prior to flammability testing); and BS EN ISO 6330:2001 (Textiles & Domestic washing and drying procedures for textile testing).

Typically these tests consist of washing the fabric at a set liquor ratio, for a set period of time and temperature. Different end uses require different wash performances, however a good benchmark for a wash procedure is as follows: 16:1 liquor ratio, 60° C. for 12 minutes, 3 minute rinses (repeated 4 times).

Also by way of example suitable flame testing includes the method set out in BS5438 (Methods of test for flammability of textile fabrics when subjected to a small igniting flame applied to the face or bottom edge of vertically orientated specimens), where the fabric is supported in a vertical frame with a butane flame of specified length applied perpendicular to the fabric for 15 seconds.

The British standard requires a fabric to meet certain criteria in order to pass the standard. The most important of these is that the length of the observed char must not exceed the size of the test frame (approximately 15 cm). Afterglow supporting a flame front and a hole in the charred region of the fabric are also observations which result in a test fail. Examples of flame test passes and failures are shown in FIG. 1 for treated cotton fabrics subjected to a test procedure in accordance with BS 5438.

Without being bound by theory, when the material is cellulosic it is believed that the reaction proceeds via a monoester with the phosphorous acid providing a cellulose phosphorous ester as a metal salt. Thus the present invention provides a treated cellulose material including the mono ester reaction product of cellulose and a monovalent metallic salt of phosphorous acid. The reaction is shown in scheme 1.

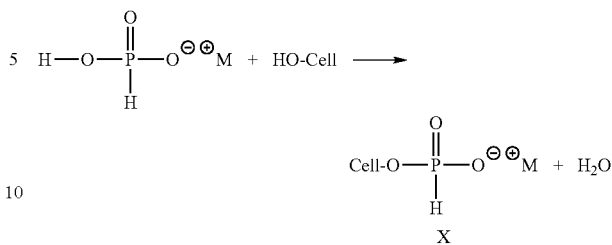

Scheme 1 wherein "Cell" represents the residue of a cellulose material, for example cotton or cotton-rich fabric, and $M^+$ is a monovalent metal cation, preferably an alkali metal cation, most preferably sodium or potassium.

In a further aspect the present invention provides a composition of matter consisting of, or comprising as the major cellulosic component present, a compound of general formula X.

It is believed that this species then reacts with a further cellulose moiety to form a di-ester species Y shown in scheme 2.

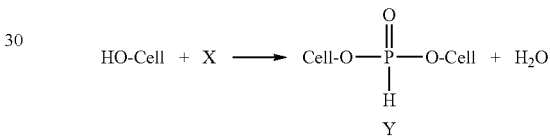

Scheme 2

Where "Cell" represents the residue of a cellulose material, for example cotton or cotton-rich fabric.

In a further aspect the present invention provides a composition of matter consisting of, or comprising as the major cellulosic component present, a compound of general formula Y.

A "major cellulosic component" herein denotes that at least 50% of cellulose treated in the method forms the compound of general formula X or Y; preferably at least 60%, more preferably at least 80%, and most preferably at least 90% (by weight).

Where the substrate contains for example keratin based fibres, nucleophiles on the keratin surface are capable of forming analogous compounds which function similarly to the cellulose di-esters.

As well as these compounds being further aspects of the invention, also the methods described for their preparation are yet further aspects of the invention.

It should be noted that the treated material of the third aspect of the present invention is a wash-durable flame retardant material which does not include residual bound nitrogen. This is different to materials treated with flame retardant compositions of the prior art, for example ammonium polyphosphates and phosphate based systems described in U.S. Pat. No. 2,482,755, in which it is taught that nitrogen is necessary to impart flame retardancy for an economical quantity of phosphorous.

It is advantageous that the present invention is able to provide a treated flame retardant material which does not include nitrogen atoms incorporated from a flame retardant composition.

It has been further found that a material treated according to the present invention has durable press properties. A material thus produced may be considered to have "easy-care" properties and thus does not need to be ironed by the consumer.

A method of the first aspect may in some embodiments be used to produce a fabric which contains creases (including folds or pleats) that are "easy-care". If, after step (x), creases are introduced into a fabric and then an optional rehydration step (y) and then a second curing step (z) are carried out, the creases introduced will be a "permanent" feature of the fabric. i.e. said creases will be durable to washing.

In some embodiments, a fabric could be taken after the first curing step (x), used to make an article (a garment, for example), and then subjected to further steps (y) (optional) and (z).

In a further aspect, the compositions used in the method of the present invention may include a dye, thereby introducing fabric colouration at the same time as flame retardant and/or easy care and/or permanent crease properties. The dye may for example be a reactive dye, a direct dye, an acid dye, a vat dye, a premetallised dye, or a mordant dye. If such compounds are present in the compositions used in the present invention the material produced may be dyed a deep colour and the dyed material may be fast to multiple washing. The dye becomes covalently bound to the fibre during step (x) and/or step (z). In an alternative embodiment a dye may be included in a second padding composition used in rehydration step (y).

In preferred embodiments however any dye present is included in the composition of the second aspect.

Preferred dyes are water-soluble reactive dyes. Suitable reactive dyes are those which include halotriazine, halopyrimidine, haloquinoxaline, vinylsulphone or α-bromoacrylamido groups. Examples of preferred reactive dyes include CI Reactive Violet 5, CI Reactive Blue 19, CI Reactive Red 23, CI Reactive Black 5, CI Reactive Orange 16 and CI Reactive Yellow 160.

In such embodiments the composition comprises at least 0.01 $gdm^{-3}$ dye, preferably at least 0.1 $gdm^{-3}$, more preferably at least 1 $gdm^{-3}$, and most preferably at least 10 $gdm^{-3}$.

The composition may suitably comprise up to 200 $gdm^{-3}$ dye, preferably up to 100 $gdm^{-3}$, more preferably up to 50 $gdm^{-3}$, and most preferably up to 20 $gdm^{-3}$.

The dye concentrations will be dependent on the colour and depth of shade that is required and such considerations are commonplace to those skilled in the art.

The invention will now further described in relation to the following non-limited examples.

EXAMPLES

Example 1

A composition of the invention is detailed in Table 1 and was prepared by the method described.

TABLE 1

| Chemical | Amount g/L |
| --- | --- |
| Phosphorous Acid | 160.6 |
| Urea | 327 |
| Potassium Hydroxide | 192 |
| Ammonium hydroxide solution (35%) | 65 |
| Sodium xylene sulphonate | 0.5 |
| Water | 600 |
| Total = | 1345.1 g |

Dissolve Phosphorous Acid (160.6 g) in water (500 ml) and then add Urea (327 g).
Add potassium hydroxide (192 g) to adjust pH to pH7
Adjust the pH to pH9 using ammonium hydroxide (65 ml).
Make up to 1 liter using water (100 ml)
Pad onto cotton fabric at ~100% wpu (wet pick-up).
Dry at 120° C. for 60 seconds
Bake at 200° C. for 90 seconds
Re-hydrate (overnight hanging/misting/steaming)
Re-bake at 200° C. for 90 seconds
Rinse fabric with water
Air dried by hanging the cloth overnight "wpu" (wet pick up) describes the percentage increase in weight of the fabric immediately after the fabric has been treated with a liquid material. Thus 100% wpu denotes that the weight of the fabric is 100% greater immediately after treatment.

When the fabric is dry, it may be stained with a solution of CI Basic Blue 47 (Astrazon Blue 3RL, Dystar); a cationic dye substantive to any negatively charged moieties such as P—O$^-$ groups on the fabric. This enables a visual assessment of the extent of reaction, in particular what is believed to be the mono-phosphite ester and di-phosphite ester formation during processing (compounds X and Y above). The staining of the treated fabric also reveals the evenness of the treatment.

The staining procedure is as follows:
Prepare stain liquor: Astrazon Blue 3RL (1 g/l)
  Sandozin NIN (1 g/l)
  Acetic Acid 3 ml/l
  pH4.5
Dip fabric into stain solution at ambient temperature (~18° C.) for 5 minutes (liquor ratio 10:1)
Rinse in cold running water for 5 minutes.
Dry stained fabric before assessment.

Figure 2:
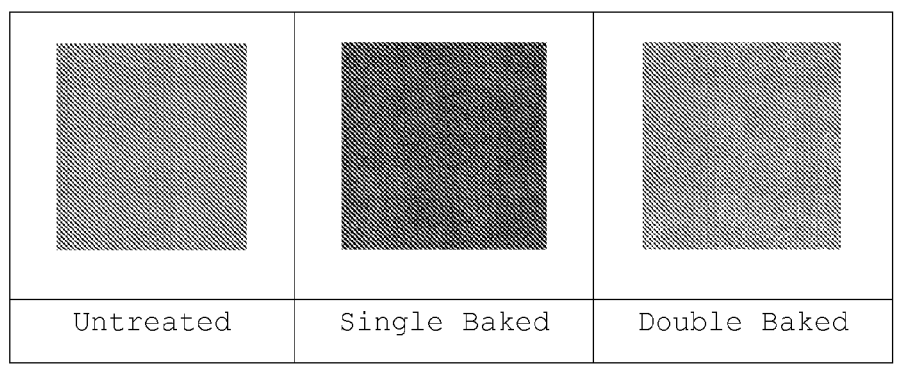
FIG. 2 shows the results of stain tests carried out on treated and untreated cotton fabrics.

Untreated cotton fabric stains weakly due to the low number of negatively charged groups on the fabric. Fabric which has been padded with fire retardant (FR) liquor (Table 1), dried and then baked once, stains very strongly due to the increased number of negatively charged groups from the mono-phosphite ester formation. Fabric which has then had a second bake (re-bake) stains weakly; which is believed to be due to the mono-phosphite ester groups forming di-phosphite ester groups, effectively reducing the number of negatively charged groups. The results of these stain tests are shown in FIG. 2.

Prior to flame testing the fabric samples are submitted to an appropriate wetting/cleansing technique as set out in British standard procedures. Such standards used are BS5651:1978 (Cleansing and wetting procedures for use in the assessment of the effect of cleansing and wetting on the flammability of textile fabrics and fabric assemblies; BS EN ISO 12138:1997 (Textiles—Domestic laundering procedures for textile fabrics prior to flammability testing; and BS EN ISO 6330:2001 Textiles & Domestic washing and drying procedures for textile testing.

Typically these tests consist of washing the fabric at a set liquor ratio, for a set period of time and temperature. Different end uses require different wash performances, however a good benchmark for a wash procedure is as follows: 16:1 liquor ratio, 60° C. for 12 minutes, 3 minute rinses (repeated 4 times). The subsequent examples have been subjected to the above wash test regime.

The fabric was then flame tested in accordance with the method set out in BS5438 (Methods of test for flammability of textile fabrics when subjected to a small igniting flame applied to the face or bottom edge of vertically orientated specimens), where the fabric is supported in a vertical frame with a butane flame of specified length applied perpendicular to the fabric for 15 seconds.

The British standard requires a fabric to meet certain criteria in order to pass the standard. The most important of these is that the length of the observed char must not exceed the size of the test frame (approximately 15 cm). Afterglow, supporting a flame front and a hole in the charred region of the fabric are also observations which result in a test fail.

Figures 3, 4:
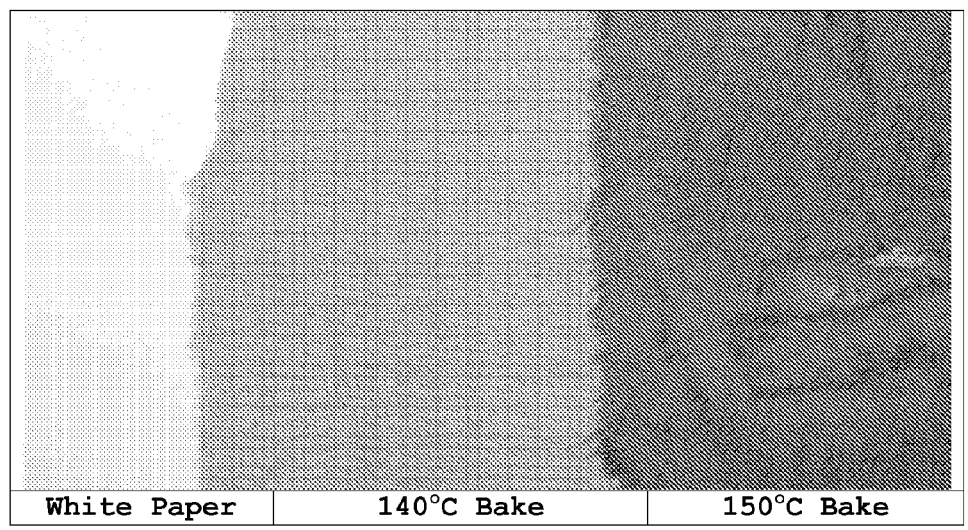
FIG. 3 shows the parameters and results of flame tests carried out on treated cotton fabrics.
FIG. 4 shows the staining of cotton fabrics treated at different temperatures.

The results are given in FIG. 3.

OWFT means subjected to no wash fastness tests

5WFT means subjected to 5 wash fastness tests

With this formulation and treatment process, it is observed that a double bake is required in order to produce wash durability.

Examples 2-6

Further compositions of the invention were prepared as detailed in Table 2 using methods analogous to that described in Example 1.

Table 2

TABLE 2

| | Example | | | | |
|---|---|---|---|---|---|
| | 2 | 3 | 4 | 5 | 6 |
| Phosphorous acid (g/L) | 160.6 | 160.6 | 160.6 | 105 | 160.6 |
| Urea (g/L) | 327 | | 237.4 | 235.4 | 327 |

TABLE 2-continued

| | Example | | | | |
|---|---|---|---|---|---|
| | 2 | 3 | 4 | 5 | 6 |
| Potassium hydroxide (g/L) | 192 | | 161 | 125.4 | 196 |
| Ammonium hydroxide solution (35%, g/L)) | 65 | 250 | 67 | 44.7 | 26 |
| Sodium xylene sulfonate (g/L) | — | 0.5 | 0.5 | 0.5 | 0.5 |
| Potassium cyanate (g/L) | — | 327 | — | | — |
| Water (g/L) | 600.5 | 499 | 597.5 | 665.1 | 650 |
| Total (g/L) | 1345.1 | 1237.1 | 1224 | 1176.1 | 1360.1 |
| Final pH | 9 | 10.6 | 9 | 9.4 | 7.4 |

Examples 7-33

The resultant solutions were dried and baked at the temperatures and for the periods indicated, and optionally rehydrated and re-baked as described. After a final bake, the fabric was rinsed with water and air dried by handing the cloth overnight.

Rehydration is achieved by overnight hanging/twisting/steaming.

When the fabric is dry, it is washed and stained in accordance with the procedures stated in example 1.

After any relevant washing procedures, the fabric is flame tested in accordance with the method set out in BS5438 as described in example 1. The results are given in Table 3 below:

TABLE 3

| | Example | | | | | | | | | | | | | |
|---|---|---|---|---|---|---|---|---|---|---|---|---|---|---|
| | 7 | 8 | 9 | 10 | 11 | 12 | 13 | 14 | 15 | 16 | 17 | 18 | 19 | 20 |
| Solution of Example | 2 | 2 | 2 | 2 | 1 | 1 | 3 | 3 | 1 | 1 | 3 | 4 | 4 | 4 |
| DRYING temperature (° C.) | 120 | 120 | 120 | 120 | — | — | — | — | — | — | — | 120 | 120 | 120 |
| Drying time(s) | 60 | 60 | 60 | 60 | — | — | — | — | — | — | — | 60 | 60 | 60 |
| 1$^{st}$ Bake temp (° C.) | 200 | 200 | 200 | 200 | 170 | 170 | 170 | 170 | 180 | 180 | 180 | 200 | 200 | 200 |
| 1st Bake time(s) | 90 | 90 | 90 | 90 | 90 | 90 | 90 | 90 | 90 | 90 | 90 | 45 | 45 | 45 |
| Rehydrated? | Yes | Yes | No | No | Yes | Yes | Yes | Yes | Yes | Yes | Yes | Yes | Yes | Yes |
| 2$^{nd}$ Bake temp (° C.) | 200 | 200 | — | — | 170 | 170 | 170 | 170 | 180 | 180 | 180 | 200 | 200 | 200 |
| 2$^{nd}$ Bake time (° C.) | 90 | 90 | — | — | 90 | 90 | 90 | 90 | 90 | 90 | 90 | 45 | 45 | 45 |
| No. of wash fastness tests | 0 | 5 | 0 | 5 | 0 | 5 | 0 | 5 | 0 | 12 | 0 | 0 | 12 | 24 |
| Result | Pass | Pass | Pass | Fail | Pass | Fail | Fail | Fail | Pass | Pass | Fail | Pass | Pass | Pass |

| | Example | | | | | | | | | | | | |
|---|---|---|---|---|---|---|---|---|---|---|---|---|---|
| | 21 | 22 | 23 | 24 | 25 | 26 | 27 | 28 | 29 | 30 | 31 | 32 | 33 |
| Solution of Example | 5 | 5 | 5 | 5 | 5 | 5 | 6 | 6 | 6 | 6 | 6 | 6 | 1 |
| DRYING temperature (° C.) | 120 | 120 | 120 | 120 | 120 | 120 | 120 | 120 | 120 | 120 | 120 | 120 | 120 |
| Drying time(s) | 60 | 60 | 60 | 60 | 60 | 60 | 60 | 60 | 60 | 60 | 60 | 60 | 60 |
| 1$^{st}$ Bake temp (° C.) | 200 | 200 | 200 | 200 | 200 | 200 | 170 | 170 | 170 | 180 | 180 | 180 | 120 |
| 1st Bake time(s) | 90 | 90 | 90 | 45 | 45 | 45 | 90 | 90 | 90 | 90 | 90 | 90 | 90 |
| Rehydrated? | Yes | Yes | Yes | Yes | Yes | Yes | Yes | Yes | Yes | Yes | Yes | Yes | Yes |
| 2$^{nd}$ Bake | 200 | 200 | 200 | 200 | 200 | 200 | 170 | 170 | 170 | 180 | 180 | 180 | 120 |

TABLE 3-continued

| | | | | | | | | | | | | | |
|---|---|---|---|---|---|---|---|---|---|---|---|---|---|
| temp (° C.) 2$^{nd}$ Bake time (° C.) | 90 | 90 | 90 | 45 | 45 | 45 | 90 | 90 | 90 | 90 | 90 | 90 | 90 |
| No. of wash fastness tests | 0 | 12 | 24 | 0 | 12 | 24 | 0 | 5 | 12 | 0 | 5 | 12 | 0 |
| Result | Pass | Fail | Fail | Pass | Fail | Fail | Pass | Fail | Fail | Pass | Pass | Pass | Fail |

The failures in this table help to clarify the limit of concentration/baking times and temperature required in order to give an acceptable wash durable performance.

Example 34

A composition of the invention is detailed in Table 4 and was prepared and applied to fabric by the method described.
Table 4

TABLE 4

| Chemical | Amount gdm$^{-3}$ |
|---|---|
| Phosphorous Acid | 90 |
| Urea | 200 |
| Potassium Hydroxide | 108 |
| Novacron Red FB | 10 |

Phosphorous acid (90 gdm$^{-3}$), urea (200 gdm$^{-3}$), Novacron Red FB (a monofluoro-s-triazine dye [Huntsman]) (10 gdm$^{-3}$) are dissolved in water and adjusted to pH10 with potassium hydroxide.

Pad onto cotton fabric at 100% wpu and then batch for 1 hour.

Bake at 200° C. for 50 seconds

Fabric is then steamed continuously prior to re-baking at 190° C. for a further 50 seconds.

Fabric is then rinsed and air dried by hanging the cloth overnight

The fabric exhibited a level red dyeing with good handle and testing showed that a wash-durable FR finish had been produced. Equally the fabric was rated as durable press (dry wrinkle recovery angle or WRA of treated fabric >200°— whereas untreated fabric has WRA of 130°) and the wash-fastness of the dyeing was excellent.

Example 35

Reference Example Not of the Invention

The composition detailed in Table 5 was prepared by the method described.
Table 5

TABLE 5

| Chemical | Amount g/L |
|---|---|
| Phosphorous Acid | 160.6 |
| Urea | 327 |
| Water | 600 |

Dissolve Phosphorous Acid (100 g) in water (100 ml) and then add Urea (100 g).
Pad onto cotton fabric at ~100% wpu (wet pick-up).
Dry at 120° C. for 60 seconds
Bake at 140° C. or 150° C. for 20 minutes
Rinse fabric with water
Air dried by hanging the cloth overnight.

After the baking stage, the sample baked at 140° C. turns brown in colour and has very low fabric strength. The sample baked at 150° C. turns a dark brown colour and has even less strength. This latter sample, upon rinsing with water, falls apart due to the total loss in fabric strength. The brown colour and loss of fabric strength is due to acid tendering of the fibre by low pH.

Example 36

A composition of Example 1 was prepared by the method described in Example 1.

This was padded onto filter paper (240 gm$^{-2}$) at ~100% wpu (wet pick-up); dried at 120° C. for 60 seconds, baked at 200° C. for 90 seconds, the paper rinsed with water and air dried by leaving filter paper on work surface.

When the paper is dry, it is carefully rinsed in tap water and then air dried overnight. A soaking test can be performed by soaking in detergent containing water for 30 minutes.

Figure 5:
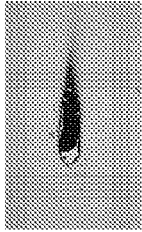
FIG. 5 shows the parameters and results of flame tests carried out on treated paper.

After any relevant washing procedures, the paper is flame tested In accordance with the method set out in BS5438 as described in example 1. The results are given in FIG. 5

In commercial use, a polymeric resin is usually applied to the paper to provide further strength characteristics, which would prevent the char from breaking.

Example 37

The method of example 1 was followed but in this case a 100% wool fabric was impregnated by padding with a urea solution which also contained 10 gdm$^{-3}$ of an anionic surfactant such as Alcopol O (Huntsman). The fabric was then padded through a phosphorous acid solution adjusted to pH5 with potassium hydroxide. Satisfactory flame retardant properties were obtained.

In this case a two pad process was used: in a first step a composition comprising urea was applied, and in a second step, a composition comprising phosphorous acid and a base was applied. It would be possible to use a single pad process to apply a composition of, for example, example 1 to a wool material, if it had first been treated by the method disclosed in PCT/GB2006/002955.

Examples 38-64

Further compositions of the present invention were prepared and applied to a material by methods analogous to that described in relation to example 1. The results are shown in Table 6.

Beetle Resin PT764 is a polyaminoamide epichlorohydin resin available from BIP as an aqueous dispersion comprising 25 wt % of solid material.

TABLE 6

| | Example | | | | | | | |
|---|---|---|---|---|---|---|---|---|
| | 38 | 39 | 40 | 41 | 42 | 43 | 44 | 45 |
| Phosphorous acid (gdm$^{-3}$) | 160 | 160 | 200 | 200 | 240 | 240 | 240 | 240 |
| Urea (gdm$^{-3}$) | 327 | 327 | 300 | 300 | 360 | 360 | 180 | 180 |
| Potassium hydroxide (gdm$^{-3}$) | 151 | 151 | 172 | 172 | 194 | 194 | 194 | 194 |
| Beetle Resin PT765 (gdm$^{-3}$) | 0 | 50 | 0 | 50 | 0 | 50 | 0 | 50 |
| Water (gdm$^{-3}$) | 620 | 570 | 550 | 500 | 469 | 419 | 626 | 577 |
| Total (gdm$^{-3}$) | 1170 | 1176 | 1237 | 1238 | 1274 | 1274 | 1240 | 1241 |
| Final pH | 5 | 5 | 5 | 5 | 5 | 5 | 5 | 5 |
| Process | | | | | | | | |
| Dry | 120° C./60 s | 120° C./60 s | 120° C./60 s | 120° C./60 s | 120° C./60 s | 120° C./60 s | 120° C./60 s | 120° C./60 s |
| Bake | 180° C./60 s | 180° C./60 s | 180° C./60 s | 180° C./60 s | 180° C./60 s | 180° C./60 s | 180° C./60 s | 180° C./60 s |
| Rehydrate overnight | yes | yes | No | No | No | No | No | No |
| Re-bake | 180° C./60 s | 180° C./60 s | No | No | No | No | No | No |
| Number of wash tests after which sample passes flame test | 12 | 12 | 12 | 12 | 12 | 12 | 12 | 12 |

| | Example | | | | | | | |
|---|---|---|---|---|---|---|---|---|
| | 46 | 47 | 48 | 49 | 50 | 51 | 52 | 53 |
| Phosphorous acid (gdm$^{-3}$) | 240 | 240 | 240 | 240 | 240 | 240 | 240 | 240 |
| Urea (gdm$^{-3}$) | 360 | 360 | 360 | 360 | 360 | 360 | 360 | 360 |
| Potassium hydroxide (gdm$^{-3}$) | 194 | 194 | 194 | 194 | 194 | 194 | 194 | 194 |
| Beetle Resin PT765 (gdm$^{-3}$) | 50 | 50 | 50 | 50 | 50 | 50 | 50 | 50 |
| Pigment/Dye (10 gdm$^{-3}$) | CI Pigment Black 7 | CI Pigment Red 122 | CI Pigment Blue 15:3 | CI Pigment Yellow 151 | CI Pigment Violet 19 | CI Pigment Red 122 | CI Vat Red 13 | Indigo |
| Water (gdm$^{-3}$) | 419 | 419 | 419 | 419 | 419 | 419 | 419 | 419 |
| Total (gdm$^{-3}$) | 1274 g | 1274 g | 1274 g | 1274 g | 1274 g | 1274 g | 1274 g | 1274 g |
| Final pH | 5 | 5 | 5 | 5 | 5 | 5 | 5 | 5 |
| Process | | | | | | | | |
| Dry | 120° C./60 s | 120° C./60 s | 120° C./60 s | 120° C./60 s | 120° C./60 s | 120° C./60 s | 120° C./60 s | 120° C./60 s |
| Bake | 180° C./60 s | 180° C./60 s | 180° C./60 s | 180° C./60 s | 180° C./60 s | 180° C./60 s | 180° C./60 s | 180° C./60 s |
| Rehydrate overnight | No | No | No | No | No | No | No | No |
| Re-bake | No | No | No | No | No | No | No | No |
| Acceptable durability and flame retardancy | Yes | Yes | Yes | Yes | Yes | Yes | Yes | Yes |

| | Example | | | | | | | |
|---|---|---|---|---|---|---|---|---|
| | 54 | 55 | 56 | 57 | 58 | 59 | 60 | 61 |
| Phosphorous acid (gdm$^{-3}$) | 240 | 240 | 240 | 240 | 0 | 0 | 0 | 0 |
| Urea (gdm$^{-3}$) | 360 | 360 | 360 | 360 | 0 | 0 | 0 | 0 |
| Potassium hydroxide (gdm$^{-3}$) | 194 | 194 | 194 | 194 | 0 | 0 | 0 | 0 |
| Beetle Resin PT765 (gdm$^{-3}$) | 50 | 50 | 50 | 50 | 50 | 50 | 50 | 50 |
| Pigment/Dye (20 gdm$^{-3}$) | Magnesium Hydroxide | Calcium carbonate | Aluminium phosphate | Magnesium phosphate | Magnesium Hydroxide | Calcium carbonate | Aluminium phosphate | Magnesium phosphate |
| Water (gdm$^{-3}$) | 419 | 419 | 419 | 419 | 419 | 419 | 419 | 419 |
| Total (gdm$^{-3}$) | 1274 g | 1274 g | 1274 g | 1274 g | 1274 g | 1274 g | 1274 g | 1274 g |
| Final pH | 5 | 5 | 5 | 5 | 5 | 5 | 5 | 5 |

TABLE 6-continued

| Process | | | | | | | | |
|---|---|---|---|---|---|---|---|---|
| Dry | 120° C./ 60 s | 120° C./ 60 s | 120° C./ 60 s | 120° C./ 60 s | 120° C./ 60 s | 120° C./ 60 s | 120° C./ 60 s | 120° C./ 60 s |
| Bake | 180° C./ 60 s | 180° C./ 60 s | 180° C./ 60 s | 180° C./ 60 s | 180° C./ 60 s | 180° C./ 60 s | 180° C./ 60 s | 180° C./ 60 s |
| Rehydrate overnight | No | No | No | No | No | No | No | No |
| Re-bake | No | No | No | No | No | No | No | No |
| Acceptable durability and flame retardancy | Yes | Yes | Yes | Yes | Yes | Yes | Yes | Yes |

| | Example | | |
|---|---|---|---|
| | 62 | 63 | 64 |
| Phosphorous acid ($gdm^{-3}$) | 240 | 240 | 240 |
| Urea ($gdm^{-3}$) | 360 | 360 | 360 |
| Potassium hydroxide ($gdm^{-3}$) | 194 | 194 | 194 |
| Beetle Resin PT765 ($gdm^{-3}$) | 50 | 50 | 50 |
| Pigment/Dye (1 $gdm^{-3}$) | CI Reactive Violet 5 | CI Reactive Blue 19 | CI Reactive Red 23 |
| Water ($gdm^{-3}$) | 419 | 419 | 419 |
| Total ($gdm^{-3}$) | 1274 g | 1274 g | 1274 g |
| Final pH | 5 | 5 | 5 |
| Process | | | |
| Dry | 120° C./ 60 s | 120° C./ 60 s | 120° C./ 60 s |
| Bake | 180° C./ 60 s | 180° C./ 60 s | 180° C./ 60 s |
| Rehydrate overnight | No | No | No |
| Re-bake | No | No | No |
| Acceptable durability and flame retardancy | Yes | Yes | Yes |

Example 65

A composition of the invention was prepared as detailed in the table below using methods analogous to that described in Example 1.

| Chemical | Amount |
|---|---|
| Phosphorous Acid (70% Soln) | 342.8 g |
| Urea | 360 g |
| Potassium Hydroxide (50% Soln) | 388 g |
| Beetle Resin PT765 (25% Solids) | 50 g |
| Deionised water | 175 ml |
| Total Weight | 1295 g |

Pad onto cotton fabric at ~90% wpu (wet pick-up).
Dry at 130° for 60 seconds.
Bake at 180° for 90 seconds.
Rinse fabric with water containing magnesium chloride (10 g/l).
Rinse fabric with water.
Dry the fabric through the stenter (oven) 150° for 60 seconds.
Optionally run the fabric through a calendaring machine to give the fabric a smooth shiny finish.

The treated fabric exhibits sufficient durability and flame retardancy to meet the criteria set out in BS5867 part 2 Type B. The use of the magnesium chloride as an after-treatment also satisfies the shrinkage requirements.

The invention claimed is:

1. A method of treating a material to improve flame retardancy, the method comprising applying to the material urea, phosphorous acid or a salt thereof, and a base comprising a monovalent metallic cation,
wherein the monovalent metallic cation is potassium.

2. A method according to claim 1 wherein the urea, phosphorous acid or salt thereof and base are applied simultaneously.

3. A method according to claim 2 wherein the base is potassium hydroxide.

4. A method according to claim 3 which further comprises curing the composition on the material.

5. A method according to claim 4 which further comprises rehydrating the material.

6. A method according to claim 5 which further comprises a second curing step.

7. A method according to claim 3 which further comprises treating the material with at least one composition selected from a group consisting of:
 (i) an acidic composition;
 (ii) a composition comprising a quaternary ammonium salt; and
 (iii) a composition comprising a metal salt.

8. A method of treating a material to improve flame retardancy, the method comprising simultaneously applying to the material urea, phosphorous acid or a salt thereof, and a base which is potassium hydroxide.

9. The method of claim 8, further comprising:
treating the material with at least one composition selected from a group consisting of:
(i) an acidic composition;
(ii) a composition comprising a quaternary ammonium salt; and
(iii) a composition comprising a metal salt.

10. A method of treating a material to improve flame retardancy, the method comprising applying to the material urea, phosphorous acid or a salt thereof, and a base comprising a monovalent metallic cation,
wherein the base is potassium hydroxide.

11. The method of claim 10, further comprising:
treating the material with at least one composition selected from a group consisting of:
(i) an acidic composition;
(ii) a composition comprising a quaternary ammonium salt; and
(iii) a composition comprising a metal salt.

\* \* \* \* \*